Parker & Sleeper,
Cutting Veneers.

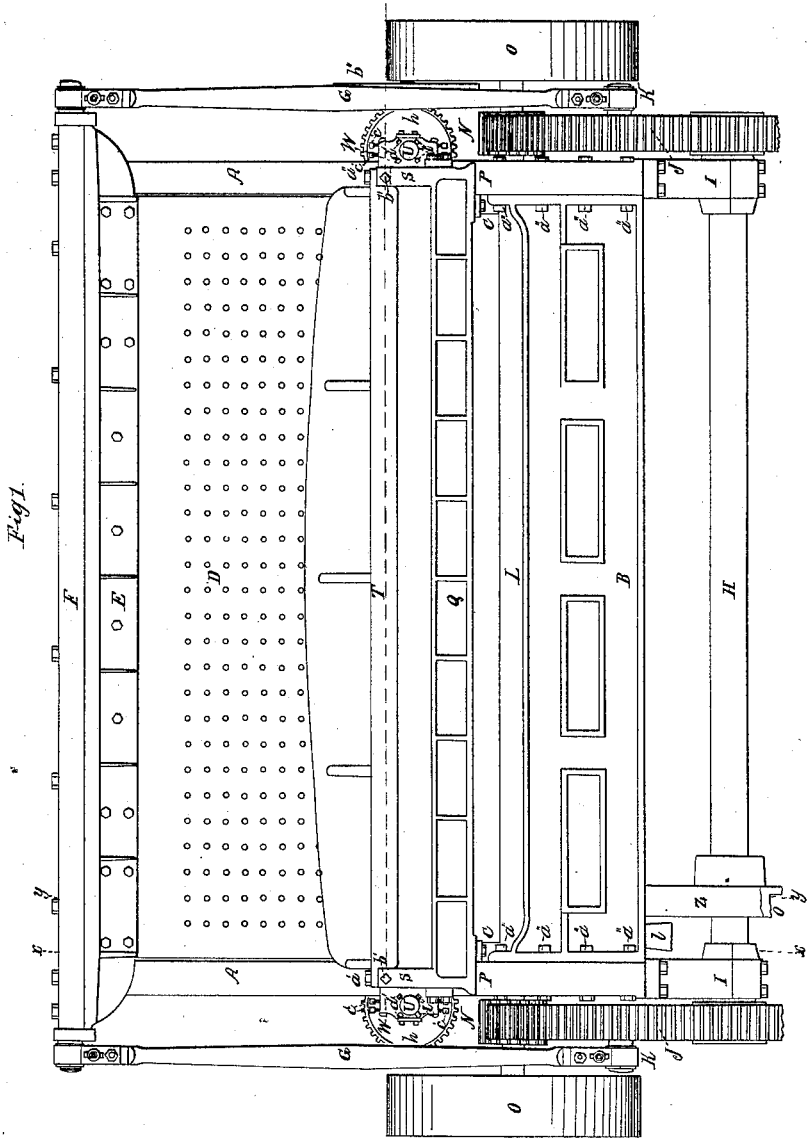

Nº 35,778. Patented July 1, 1862.

5 Sheets. Sheet 2.

Witnesses:
Chas. W. Hawkes
B. F. W. Folsom

Inventors.
Harrison Parker
Jonathan C. Sleeper

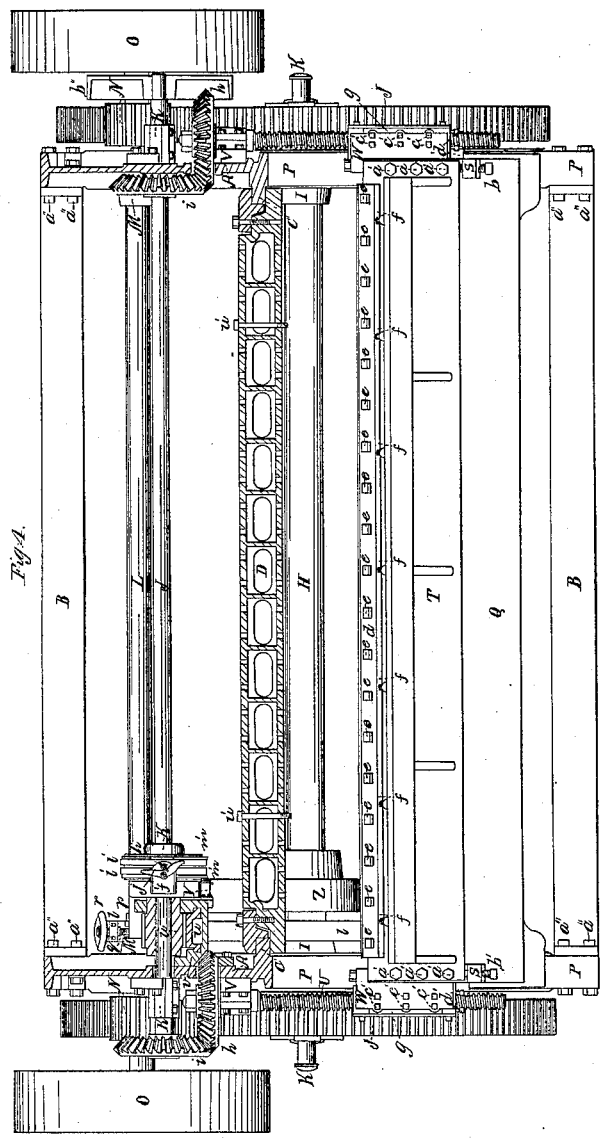

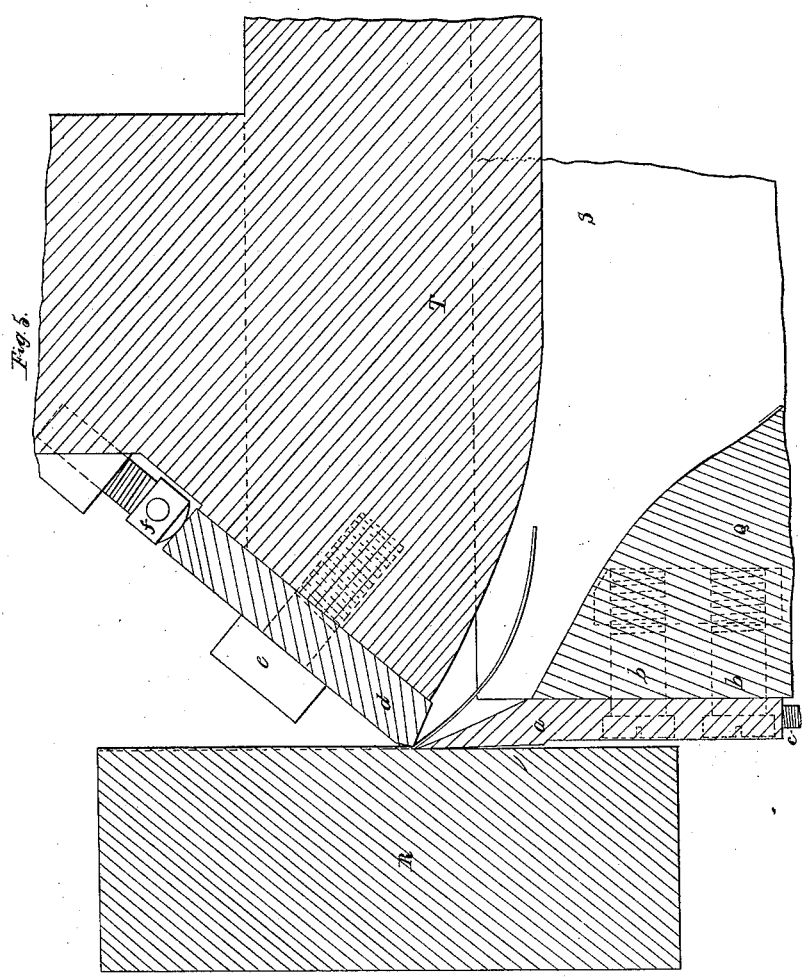

*Parker & Sleeper,*
*Cutting Veneers.*
5 Sheets—Sheet 5.
Nº 35778.
Patented July 1, 1862.
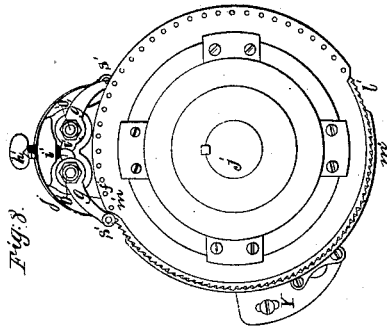
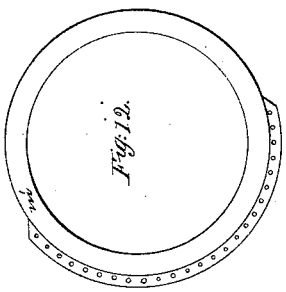
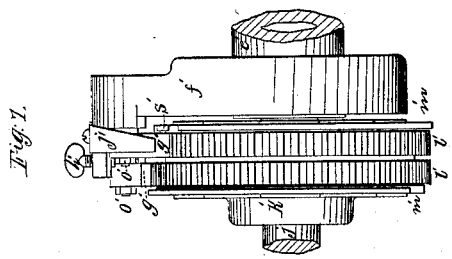
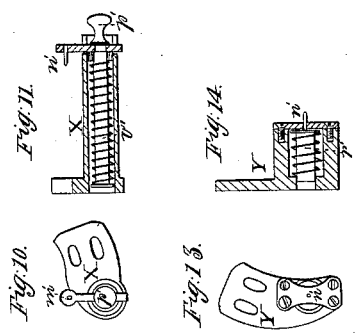
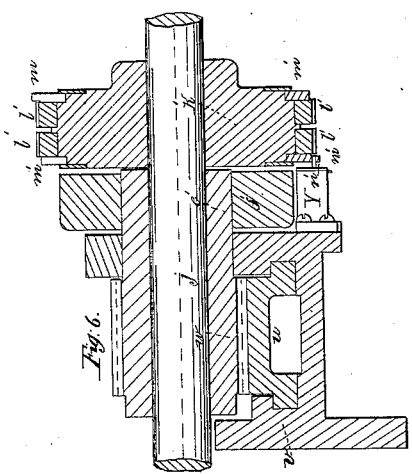
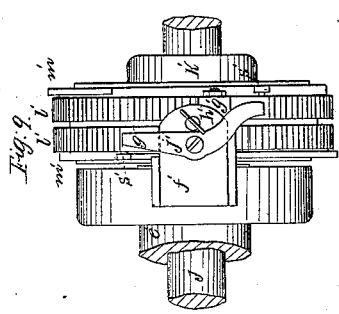
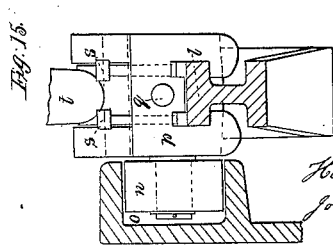
Witnesses:
Chas. W. Hawkes.
B. F. W. Folsom.
Inventors.
Harrison Parker
Jonathan C. Sleeper

UNITED STATES PATENT OFFICE.

HARRISON PARKER AND JONATHAN C. SLEEPER, OF BOSTON, MASSACHUSETTS.

IMPROVEMENT IN MACHINERY FOR CUTTING VENEERS.

Specification forming part of Letters Patent No. 35,778, dated July 1, 1862.

*To all whom it may concern:*

Be it known that we, HARRISON PARKER and JONATHAN C. SLEEPER, both of Boston, in the county of Suffolk and Commonwealth of Massachusetts, have invented certain new and useful Improvements on a Machine for Cutting Veneers; and we do hereby declare that the following is a full, clear, and exact description of the construction and operation of the same, reference being had to the accompanying drawings, making a part of this specification, and to the letters of reference marked thereon, in which—

Figure 3:
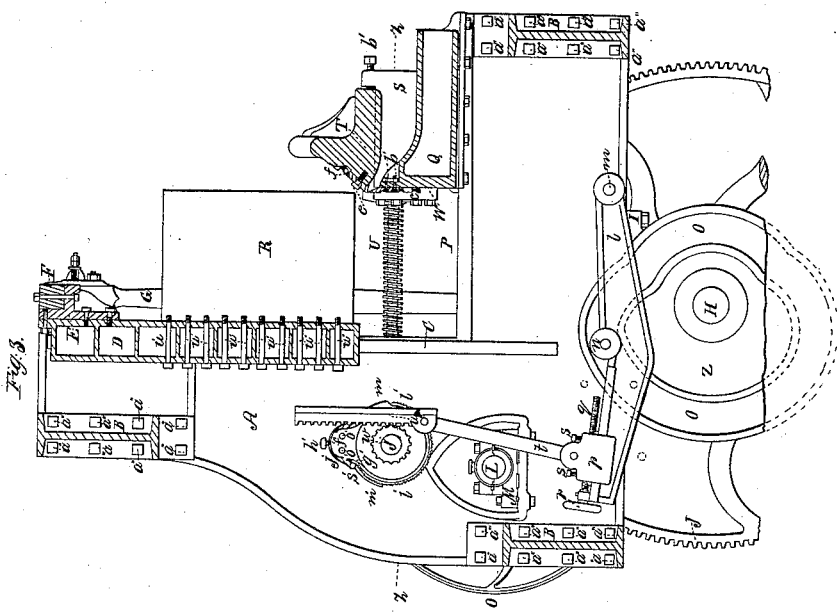
Figure 2:
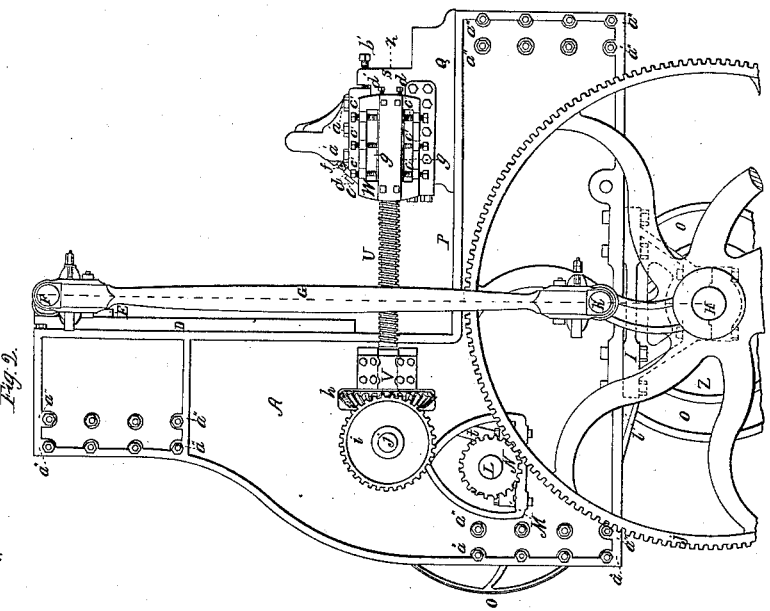

Figure 1 is a front elevation. Fig. 2 is an end elevation. Fig. 3 is a vertical transverse section taken at the line $x\ x$ of the feed-motion and $y\ y$ of the bed-plate in Fig. 1. Fig. 4 is a horizontal section taken at the line $z\ z$ in Figs. 2 and 3. Fig. 5 is a vertical transverse section of the knife and pressure-bar, full size, taken at the line $x\ x$ in Fig. 1. Fig. 6 is a detached horizontal section of the ratchet, pinion, and rack. Fig. 7 is a detached side view of the ratchet and pawl-lever. Fig. 8 is a detached front view of the ratchet and pawl-lever. Fig. 9 is a detached horizontal view of the ratchet and pawl-lever. Fig. 10 is a plan, and Fig. 11 is a section, of the dog X or incline-ring holder. Fig. 12 is a side view of one of the incline rings. Fig. 13 is a plan, and Fig. 14 is a section, of the dog Y or incline-ring holder. Fig. 15 is a transverse section of the cam-lever and a portion of the cam, showing the manner in which the slide-block is attached to the cam-lever.

The blue diagonal lines represent sections, and similar letters of reference indicate corresponding parts in the several figures.

The nature of our invention and in what manner the same is to be performed is particularly described in the following statement thereof—that is to say:

This invention has for its object new and useful improvements in machinery for cutting veneers. For this purpose the log or block from which the veneers are to be cut is firmly secured to a bed-plate by means of bolts which pass through the bed-plate and screw into the log or block. The bed-plate is perforated with holes at equal distances apart and a sufficient number of them to receive a requisite number of bolts to hold the block firmly thereto. The bed-plate may be placed in a vertical, a horizontal, or a diagonal position; but it is preferred to place it in a vertical position. The bed-plate, together with the block carried thereby, has a motion up and down a distance somewhat over and above the width of the largest block to be cut, and this motion is by preference communicated to it by means of two cranks and two connecting-rods—one at each end of the bed-plate. The knife, when making the cut, is stationary, but is capable of being moved toward and from the bed-plate by the action of the feed-motion, which, by means of a double ratchet, causes it to recede immediately after the cut and again to move forward immediately before the cut a distance depending on the thickness of the veneer next to be cut. The knife consists of a straight cutting-edge with one side beveled off, and is firmly secured to a knife-block which is made to slide toward and from the bed-plate. A little before the edge of the knife there is a pressure-bar made adjustable by set-screws and bolted firmly in its required position to a pressure-beam, so as to give a very heavy pressure on the surface of the block immediately on the point or line of cut. The pressure-beam is also made adjustable by set-screws, so that it may be set toward or from the edge of the knife, according to the amount of pressure required and the thickness of the veneer to be cut, and then held firmly to the knife-block in its required position by means of bolts. The knife-block is held firmly in its relative position to the bed-plate by means of powerful feed-screws, so that any amount of pressure required can be given to the pressure-bar. In our experiments it has been found that, unless a very heavy pressure is given on the surface of the block near or on the line of cut, the veneer is so crippled or cracked in cutting that it is unfit for use.

The main feature in our invention is the peculiar method of applying the pressure to the surface of the block at or near the line of cut and of graduating the same to the different thicknesses of veneers, also the method of feeding the knife and of graduating the feed to the different thicknesses of veneers to be cut. By this method we are enabled to cut veneers perfectly sound and free from cracks from any kind of wood and to any thickness required.

Having thus explained the nature of our invention, we will proceed more fully to describe the manner of performing the same.

The frame is composed of two side pieces, A A, and three girts, B B B, secured together in the usual manner with bolts $a'' a''$. There is a vertical guide, C, formed on each of the side pieces, A A, projecting inwardly, and a bed-plate, D, is fitted to slide freely thereon. A cross-head, E, is bolted to the upper part of the bed-plate D with a wrought-iron cross-beam, F, secured thereto. This cross-beam is longer than the bed-plate or cross-head, and extends out by the frame at each end with wrist-pins made thereon, to which the upper end of the connecting-rods G G are attached. The main shaft H is hung below the frame and fitted to revolve in boxes or hangers I I, which are bolted to the bottom of the frame A A. This shaft has a large gear-wheel, J, fixed on each end outside of the frame with a crank-pin, K, set therein, to which the lower end of the connecting-rods G G are attached. These crank-pins K K are set in the gears a suitable distance from the center to give the required motion or length of stroke to the bed-plate. The driving or pinion shaft L is fitted to revolve in boxes M M, which are set in the rear part of the frame. This pinion-shaft L has two small pinions, N N, fixed thereon, one near each end outside of the frame, that gear into and drive the large gear-wheels J J. This pinion-shaft L also has two driving-pulleys, O O, fixed thereon, one on each end of the shaft outside of the pinion.

A portion of the lower part of the sides of the frame A A projects out in front a distance sufficient to form a seat, P P, in a horizontal plane for the knife-block Q to rest and slide upon. The knife-block Q extends across from one side of the frame to the other and has its bearing at each end on the seat P P, to which it is fitted to slide toward and from the bed-plate D. The knife $a$ is secured to the knife-block Q by screws $b b$, and made adjustable by a series of set screws, $c$. A portion of this knife on the side next to the log or block R, from the edge downward, is ground straight, or in a vertical plane, so that it may have a bearing against the wood a little below the edge of the knife, or, in other words, a continuous bearing from the edge a short distance downward.

The knife-block Q at each end has an upward projection, S, on which the pressure-beam T rests. This pressure-beam T extends the entire length of the knife-block Q and has its bearing at each end, and is made adjustable at each end by a set-screw, $b'$, and when properly adjusted it is firmly secured at each end to the knife-block Q by bolts $a' a' a'$, which screw down into the projections S S. The pressure-bar $d$ stands at an angle of about forty degrees from the plane of the bed-plate D, and in that position is held firmly to the pressure-beam T by a series of bolts, $e$. This pressure-bar $d$ is also made adjustable by a series of set-screws, $f$, bearing against its upper edge and screwing into the pressure-beam T. In constructing this pressure-bar $d$ the peculiar shape of the lower part directly back of the cutting-edge of the knife is the most important thing to be obtained. It is the peculiar shape of the pressure-bar $d$ directly in front of the cut and the amount and manner of applying the pressure that enable us to cut veneers without cracking the wood in process of cutting.

The shape and position of the pressure-bar $d$ and knife $a$ is clearly represented in Fig. 5, where they are drawn full size and in the act of cutting. It is necessary to have a very heavy pressure directly on the line of cut with a slight compression of the wood below the cut and gradually diminishing to nothing in order to cut the veneers without cracking them.

There are two horizontal feed-screws, U U, one at each end of the knife-block Q, which are closely fitted with journals to revolve without any lateral motion in boxes V V, firmly attached to the outside of the frame A A. The feed-screws U U are made square-threaded and are fitted to work in corresponding screw-nuts $g g$, which are held in nut-boxes W W, firmly attached to the end of the knife-block Q. These nuts $g g$ are made in halves and provided with set screws $c' c' c' c' c' c'$ above and below to adjust them and prevent any play in case of wear, and also with set-screws $d' d'$ at the front end to prevent any lateral motion. Each of the feed-screws U has a bevel-gear, $h$, fixed on the rear end, which takes into corresponding gears, $i i$, fixed on a horizontal feed-shaft, $j$, running across the machine back of the bed-plate D. This feed-shaft $j$ is made to revolve in boxes $k k$, attached to the frame A A, and when set in motion the bevel-gears $i i$ thereon mesh into and turn the bevel-gears $h h$, together with the feed-screws U U, thereby giving a uniform feed to both ends of the knife-block Q.

There is a fixed cam, Z, on the main shaft H inside of the frame A, and by the side of this cam Z there is a cam-lever, $l$, hung at one end for its fulcrum $m$ in the fore part of the frame A. This cam-lever $l$ has a roller, $n$, attached to one side near the center of its length, which is fitted to work in a cam-shaped groove, $o$, cut in the side of the cam Z. This groove $o$ is made in a suitable form to give the required up-and-down motion at intervals to the cam-lever $l$. On the rear end of the cam-lever $l$, back of the roller $n$, there is a slide-block, $p$, fitted to slide toward and from the roller $n$, for the purpose of adjusting the effective throw of the cam lever $l$. This slide-block $p$ is moved back and forth by means of a screw, $q$, with a hand-wheel, $r$, thereon, by which it is turned, and when the slide-block $p$ is properly adjusted it may be more firmly secured in its required position by set-screws *s s*. There is a connecting-rod, *t*, attached to the slide-block *p*, and, extending upward, takes hold of the lower end of a vertical rack, *u*. This rack *u* is held in its position by a stand, *v*, attached to the frame A and allowed to slide up and down therein. This rack *u* is also provided with teeth which mesh into corresponding teeth in a loose pinion, *w*, on the feed-shaft *j*. The pinion *w* is fitted to revolve loosely on the feed-shaft *j*, and it has a hub, *e'*, extending out on one side, on which a pawl-lever, *f'*, is permanently fixed. The pawl-lever *f'* is provided with two pawls, *g' g'*, which throw in opposite directions, and a thumb-screw, *h'*, to lift the pawls *g' g'*. This thumb-screw *h'* is set in the upper part of the pawl-lever *f'*, with its lower end resting upon a lip, *i'*, projecting from the inside of the hub of each pawl *g'*. These pawls *g' g'* are made to swing on studs *o' o'*, set in the pawl-lever *f'*, and are held down by a spring, *j'*, pressing the outer end of the pawls *g' g'*, and each pawl *g'* has a friction-roller, *s'*, attached to one side near the outer end. A hub, *k'*, is fixed on the feed-shaft *j* directly under the pawls *g' g'*, and on this hub *k'* are two steel ratchet-rings, *l' l'*, with teeth or notches cut in their periphery in opposite directions, forming a double ratchet to throw both right and left. Each ratchet-ring *l'* is supplied with an incline ring, *m'*, which is fitted to turn loosely on the hub *k'* directly under the friction-roller *s'*, and is capable of being set in different positions. Each of the incline rings *m'* has a series of holes made through it equidistant from its center, and is held in any required position by means of dogs X and Y, each of which has a pin, *n'*, fitted to enter one of the holes made in the incline ring *m'*. These incline rings *m' m'* are intended to lift the pawls *g' g'* (by means of the friction-rollers *s' s'*, attached thereto) from the ratchets *l' l'*, thereby limiting each pawl *g'* independently to operate on any number of teeth required.

In Fig. 6 the dog Y is attached to the stand *v*, with its pin *n'* in one of the holes in the incline ring *m'*. This pin *n'* is held in its position by a spiral spring, *r'*, as represented in Fig. 14, and is capable of being pressed back at pleasure, so as to allow the incline ring *m'* to be turned from one hole to another.

The dog X (represented in Figs. 10 and 11) is also to be attached to the stand *v*, and operates in a similar manner to dog Y, only the spring *v'* throws in an opposite direction. This dog is designed to hold the outside incline ring *m'*, the operation of which will clearly be seen by referring to Fig. 11. Thus, by pulling upon the knob *p'*, the pin *n'* is withdrawn from one hole and the incline ring readily turned to allow it to drop into another.

By referring to Fig. 8, and supposing the pawl-lever *f'* to be swinging to the right, the friction-roller *s'* is just on the point of rolling up on the incline to the higher part of the incline ring *m'*, and is then allowed to travel thereon a short distance, holding the pawl *g'* up from the ratchet *l'*, and on the return motion of the pawl-lever *f'* the pawl *g'* again drops onto the ratchet *l'* and turns it until the motion of the pawl-lever *f'* is again reversed. By this arrangement it will be seen that the incline rings *m' m'* can readily be set so as to allow the pawls *g' g'* independently to turn the ratchet *l'* any number of teeth required. The office of this arrangement is to feed both ways. For instance, the incline rings can be set so that the ratchet will turn forward one-third of a revolution and back one-quarter of a revolution, or in any other proportion required.

The log or block R to be cut into veneers is firmly secured to the bed-plate D by means of bolts *u' u'*, which pass through holes made in the bed-plate D and screw into the block R.

Operation: By attaching belts to the driving-pulleys O O and giving motion to the pinion-shaft L the pinions N N will turn the large gear-wheels J J, and by means of the connecting-rods G G the bed-plate D, with the block R attached thereto, will be made to slide up and down on the guides C C and cut a veneer from the block R at every revolution of the large gear-wheels J J. In Fig. 3 the bed-plate D is up and the knife *a* is in the proper position to commence cutting. During that portion of the downward motion of the bed-plate D while the cut is being performed the roller *n* rolls on the smallest part of the cam Z, which is on a true circle from its center, thereby allowing the cam-lever *l* to remain at rest in its lowest position during the whole time the cut is being performed. Immediately after the cut is completed, and while the crank-pins K K are passing under the center, the cam-lever *l* rises to its highest position, forcing the rack *u* upward with it, which causes the pinion *w* to turn, together with the pawl-lever *f'*, and by the action of the pawl *g'* on the ratchet *l'* the feed-shaft *j*, togethe with the feed-screws U U, are made to turn, which causes the knife-block Q to recede a sufficient distance to allow the log or block R to pass up without touching the edge of the knife *a*. During that portion of the upward motion of the bed-plate D while the log or block R is passing the knife *a* the roller *n* rolls on the largest part of the cam Z, which is on a true circle from its center, thereby allowing the cam-lever *l* to remain at rest in its highest position during the whole time the log or block R is passing the knife *a*; and immediately after the log R passes the knife *a*, and while the crank-pins K K are passing over the center, the cam-lever *l*, together with the rack *u*, drops to its lowest position again, thereby causing the knife-block Q to be fed forward a distance depending on the thickness of the veneer next to be cut in addition to the back motion before given. By this arrangement for a feed-motion, wood can be cut to any thickness required, from the very thinnest veneer up to three-sixteenths of an inch in thickness, or even thicker, if desirable. The use of the slide-block $p$ is to vary the distance of motion given to the rack $u$. For instance, if by changing the ratchet one tooth should be found to be too great a change, the slide-block $p$ can be set so as to take any part of a tooth, even the hundredth part, if required, thereby graduating the thickness of veneers to any point of nicety required. This slide-block $p$ can also be used to change the distance of motion required to be given to the rack $u$ from thick veneers to thin, and from thin to thick. When the log or block R is entirely cut up into veneers, the thumb-screw $h'$ is to be turned so as to press down upon the lips $i'$ $i'$ and raise the pawls $g'$ $g'$ up, so that the ratchet $l'$ may be made to revolve freely in either direction. The knife-block Q may then be run back by attaching a belt to the pulley $b''$ on the feed-shaft $j$, or by any other practical device.

Having thus given a full description of the nature, construction, and operation of our invention, we will now proceed to point out the parts which we claim.

1. The pressure-bar $d$, adjusted as herein described, in combination with the feed-screws U U, for holding the pressure when used for cutting veneers, operated by the mechanism in the manner and for the purpose herein specified.

2. The double ratchet constructed and operated as herein described, for the purpose specified.

3. The cam-lever $l$, in combination with the adjustable slide-block $p$ thereon, substantially in the manner and for the purpose herein described.

4. The combined arrangement herein specified for giving a back and forward self-feeding movement to the knife, whereby the knife recedes from the block or wood for the return motion, and is again fed forward for the cut, substantially as herein described.

HARRISON PARKER.
   JONATHAN C. SLEEPER.

Witnesses:
 CHAS. W. HAWKES,
 B. F. W. FOLSOM.